(12) United States Patent
Guard et al.

(10) Patent No.: US 9,965,106 B2
(45) Date of Patent: May 8, 2018

(54) TOUCH SCREEN WITH ELECTRODES POSITIONED BETWEEN PIXELS

(75) Inventors: David Brent Guard, Southampton (GB); Matthew Trend, Fareham (GB)

(73) Assignee: Atmel Corporation, Chandler, AZ (US)

( * ) Notice: Subject to any disclaimer, the term of this patent is extended or adjusted under 35 U.S.C. 154(b) by 1468 days.

(21) Appl. No.: 13/350,018

(22) Filed: Jan. 13, 2012

(65) Prior Publication Data

US 2013/0127739 A1 May 23, 2013

Related U.S. Application Data

(60) Provisional application No. 61/563,007, filed on Nov. 22, 2011.

(51) Int. Cl.
*G09G 1/00* (2006.01)
*G06F 3/044* (2006.01)

(52) U.S. Cl.
CPC .................... *G06F 3/044* (2013.01)

(58) Field of Classification Search
CPC ............ G09G 2300/0426; G06F 3/044; G06F 3/0412; G06F 3/0416; G06F 2203/04103; G02F 1/1337; G02F 1/133; G02F 1/13
USPC .................................................. 345/173, 174
See application file for complete search history.

(56) References Cited

U.S. PATENT DOCUMENTS

| | | |
|---|---|---|
| 4,290,061 A | 9/1981 | Serrano |
| 5,122,787 A | 6/1992 | Fujita |
| 5,418,551 A | 5/1995 | Ise |
| 6,501,529 B1 | 12/2002 | Kurihara |
| 7,463,246 B2 | 12/2008 | MacKey |
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,134,535 B2 | 3/2012 | Choi |
| 8,179,381 B2 | 5/2012 | Frey |
| 8,184,107 B2 | 5/2012 | Lee |
| 8,243,027 B2 | 8/2012 | Hotelling |
| 8,355,006 B2 | 1/2013 | Park et al. |
| 8,456,444 B2 | 6/2013 | Ishizaki et al. |
| 2008/0007533 A1 | 1/2008 | Hotelling |
| 2008/0062148 A1 | 3/2008 | Hotelling |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Michael Faragalla
(74) *Attorney, Agent, or Firm* — Baker Botts L.L.P.

(57) ABSTRACT

In one embodiment, an apparatus includes a two-dimensional array of pixels configured to produce an image. The apparatus also includes a touch sensor comprising a plurality of electrodes aligned with one or more gaps between one more pixels of the two-dimensional array of pixels. The plurality of electrodes are aligned such that the plurality of electrodes do not cross over at least one pixel of the two-dimensional array of pixels.

22 Claims, 3 Drawing Sheets

(56) References Cited

U.S. PATENT DOCUMENTS

| | | |
|---|---|---|
| 2009/0315854 A1 | 12/2009 | Matsuo |
| 2010/0033781 A1* | 2/2010 | Leister .................. G03H 1/02 359/9 |
| 2010/0045632 A1* | 2/2010 | Yilmaz ................ G01D 5/2405 345/174 |
| 2010/0214247 A1* | 8/2010 | Tang ..................... G06F 3/044 345/173 |
| 2010/0238134 A1 | 9/2010 | Day |
| 2010/0302202 A1 | 12/2010 | Takeuchi |
| 2011/0210941 A1 | 9/2011 | Reynolds |
| 2011/0261005 A1 | 10/2011 | Joharapurkar |
| 2011/0267295 A1 | 11/2011 | Noguchi |
| 2011/0267305 A1 | 11/2011 | Shahparnia |
| 2011/0310035 A1* | 12/2011 | Kim ...................... G06F 3/044 345/173 |
| 2012/0013565 A1 | 1/2012 | Westhues |
| 2012/0044187 A1* | 2/2012 | Polishchuk ............ G06F 3/044 345/174 |
| 2012/0062511 A1 | 3/2012 | Ishizaki |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

\* cited by examiner

TOUCH SCREEN WITH ELECTRODES POSITIONED BETWEEN PIXELS

RELATED APPLICATION

This application claims the benefit, under 35 U.S.C. § 119(e), of U.S. Provisional Patent Application No. 61/563,007 filed 22 Nov. 2011.

TECHNICAL FIELD

This disclosure generally relates to touch screens with electrodes positioned between the pixels.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
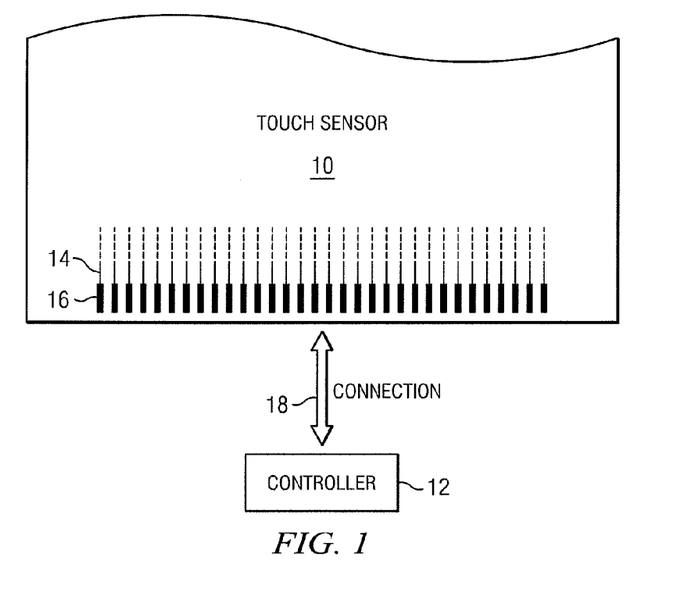
FIG. 1 illustrates an example touch sensor with an example controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, thin line other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As example, and not by way of limitation, the mechanical stack may include one or more layers of a display stack. The corresponding layers of the display stack may comprise the substrate of the mechanical stack. As another example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of between approximately 5 µm and 0.5 µm and a width of approximately between 10 µm and 1 µm. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node. Touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately between 100 μm and 10 μm. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
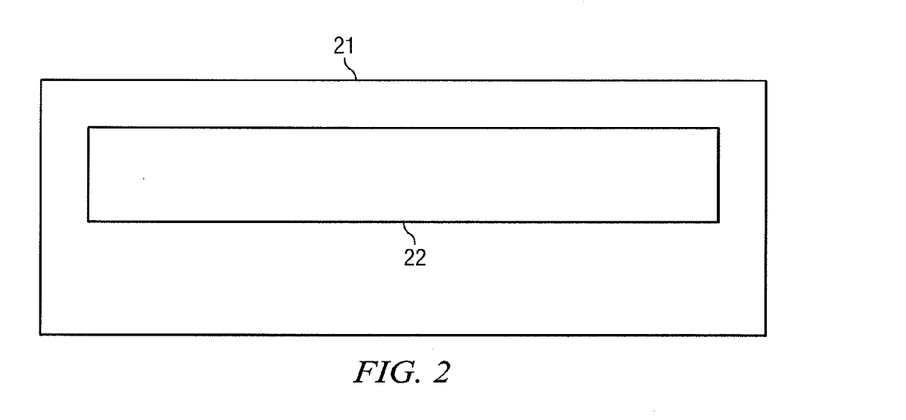
FIG. 2 illustrates a block diagram of a touch sensor provided within a display stack.

FIG. 2 illustrates a block diagram of touch sensor 22 provided within display stack 21, in accordance with particular embodiments. Display stack 21 may comprise a plurality of layers configured to generate a color image. The color image may be comprised of a two-dimensional array of pixels. The type and number of layers within display stack 21 may vary depending on the type of display stack and/or the intended application of the display stack. For example, an LCD based display stack 21 may include two or more polarizers while an OLED based display stack may include only one, or no, polarizers. Each layer of display stack 21 may comprise a particular feature or characteristic used by display stack 21 for generating an image. These layers may, in some embodiments, be configured to provide a color image. Particular embodiments contemplate display stack 21 comprising any number and/or type of layers for any type of display. In some embodiments, display stack 21 may be a flexible display stack. In some embodiments, display stack 21 may comprise a curved surface (as opposed to the straight surface depicted in FIG. 2).

One or more components of touch sensor 22 may be integrated into display stack 21 in any of a variety of different ways, depending on operational needs or the particular embodiment. Touch sensor 22 may be located in any of a variety of different locations within display stack 21. The location of touch sensor 22 may vary depending on the type of display (e.g., an LCD display, OLED display, etc.). For example, in an LCD display in which display stack 21 includes one or more polarizers, touch sensor 22 may be positioned within display stack 21 so as to not alter the light before it passes through one or more of the polarizers. For example, if touch sensor 22 includes a substrate made of a birefringent material, then touch sensor 22 may be positioned above any polarizers within display stack 21. If touch sensor 22 includes a substrate made of a non-birefringent material, touch sensor 22 may be positioned between the polarizers of display stack 21. As another example, in an OLED based display stack 21, it may not matter whether or not touch sensor 22 uses a birefringent material. In such an embodiment, touch sensor 22 may be positioned within any appropriate location within display stack 21. As yet another example, in some embodiments touch sensor 22 may use an existing layer (e.g., a layer found in a typical non-touch display stack, such as the color filter layer or one of the polarizer layers, etc.) of display stack 21 as its substrate.

In certain embodiments, the electrodes of touch sensor 22 may be deposited or laminated such that they are aligned with the gaps between the pixels of display stack 21. The number, shape, and size of the pixels may vary between embodiments and/or within embodiments (e.g., an embodiment may use a different size/shape pixel for each of the three primary colors). The electrodes may be aligned such that when display stack 21 is viewed from above, the electrodes are aligned with the gaps between the pixels of display stack 21. Depending on the embodiment, the electrodes may be deposited or laminated on any layer above the pixels of display stack 21 while still maintaining their alignment with the gaps between the pixels. In some embodiments, the electrodes may be deposited or laminated on top of, or above, display stack 21. For example, the electrodes may be a part of a cover that is placed on display stack 21 to provide touch sensor functionality.

Touch sensor 22 may be similar to, and comprise similar components and functionality as, touch sensor 10 described above with respect to FIG. 1. Depending on the embodiment and/or operational needs, touch sensor 22 may be a laminated layer within display stack 21, or one or more of the components of touch sensor 22 (e.g., fine line metal electrodes for sensing a touch input) may be deposited on an existing layer (e.g., a layer that provides a function with respect to producing an image, irrespective of touch sensing) of display stack 21. This may allow the touch sensing functionality to be included during the manufacturing of display stack 21. Regardless of whether touch sensor 22 uses an existing layer within display stack 21 or uses an additional layer added to, or on top of, display stack 21, the electrodes of touch sensor 22 may be aligned with the gaps that may exist between the pixels of display stack 21.

In embodiments in which touch sensor 22 is deposited on an existing layer of display stack 21, the existing layer of display stack 21 may function as the substrate for touch sensor 22. In other embodiments, touch sensor 22 may comprise its own substrate that is placed within display stack 21. Depending on the type of display and/or the desired location of touch sensor 22 within display stack, the substrate used for touch sensor 21 may birefringent or non-birefringent. In certain embodiments, having touch sensor 22 within display stack 21 allows for a display stack with touch sensing capability that is substantially free of any air gaps between touch sensor 22 and display stack 21. In certain embodiments, having touch sensor 22 within display stack 21 allows for a display stack with touch sensing capability that is thinner than a traditional display stack with a touch sensor added on top of the display stack (typically with an air gap between the touch sensor and the display stack).

Figure 3A:
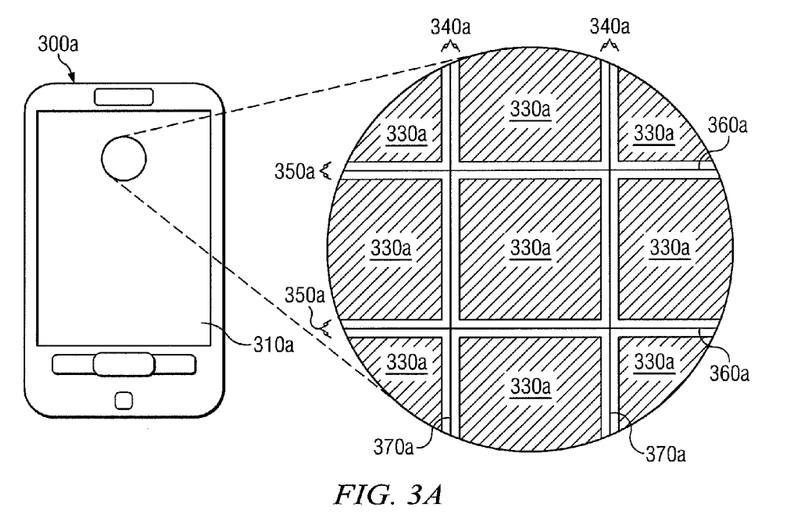
FIG. 3A illustrates an electronic device and an enlarged view of its touch screen with substantially straight electrodes.

FIG. 3A illustrates an electronic device and an enlarged view of its touch screen with substantially straight electrodes. As depicted, electronic device 300a comprises a screen 310a in which drive electrodes 360a and sense electrodes 370a are located within gaps 340a and 350a, respectively, of display screen 310a. In the depicted embodiment, drive electrodes 360a and sense electrodes 370a are substantially straight electrodes positioned between pixels 330a. In particular embodiments, electrodes 360a and 370a may be made of fine lines of metal. In certain embodiments, the crisscrossing, or orthogonal, arrangement of drive electrodes 360a and sense electrodes 370a may form a sensor mesh. The crisscrossing arrangement of drive electrodes 360a and sense electrodes 370a may be such that the electrodes do not directly contact one another. For example, in some embodiments, drive electrodes 360a and sense electrodes 370a may be on opposite sides of a substrate. As another example, in some embodiments, there may be a dielectric layer between drive electrodes 360a and sense electrodes 370a. As another example, in some embodiments, drive electrodes 360a and sense electrodes 370a may be routed so as to avoid direct contact. As discussed above, electrodes 360a and 370a may be located within a display stack comprising pixels 330a, or electrodes 360a and 370a may be located on top of the display stack comprising pixels 330a. Depending on the embodiment, electrodes 360a and 370a may be deposited or laminated.

Figure 3B:
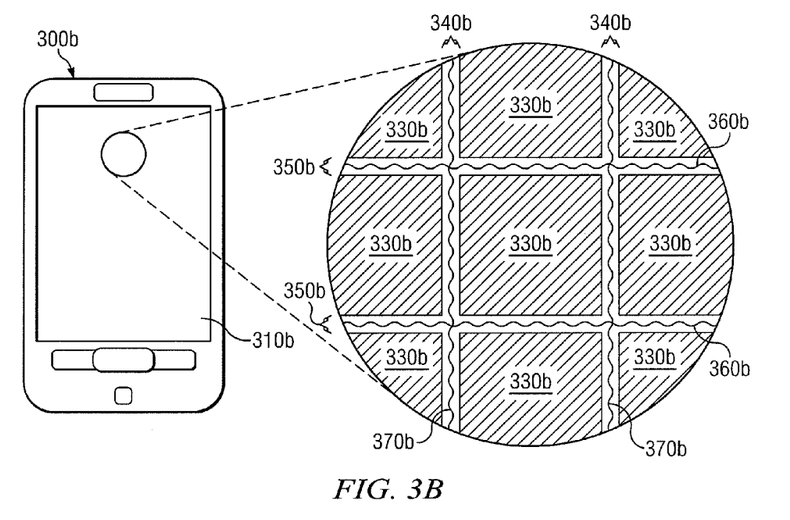
FIG. 3B illustrates an electronic device and an enlarged view of its touch screen with substantially sinusoidal electrodes.

FIG. 3B illustrates an electronic device and an enlarged view of its touch screen with substantially sinusoidal electrodes. Similar to electronic device 300a, electronic device 300b includes a screen 310b in which drive electrodes 360b and sense electrodes 370b are aligned with gaps 340b and 350b between pixels 330b. However, as can be seen in the depicted embodiment, drive electrodes 360b and sense electrodes 370b comprise a sinusoidal waveform as opposed to a straight line. In particular embodiments, electrodes 360b and 370b may be made of fine lines of metal. In certain embodiments, the generally crisscrossing, or orthogonal, arrangement of drive electrodes 360b and sense electrodes 370b may form a sensor mesh. As discussed above, electrodes 360b and 370b may be located within a display stack comprising pixels 330b, or electrodes 360b and 370b may be located on top of the display stack comprising pixels 330b. Depending on the embodiment, electrodes 360b and 370b may be deposited or laminated.

Electrodes 360b and 370b may be arranged as a sinusoidal line centered on a path that would be taken by a straight line between pixels 330b. The distance from peak to valley of any particular wave may correspond to the gap size of gaps 340b and/or 350b. The resulting mesh cells of the depicted embodiment may be described as substantially square because the sinusoidal shape electrodes 360b and 370b may result in mesh cells that are substantially, but not precisely, square shaped (other embodiments may comprise a substantially rectangular shaped mesh pattern). In some embodiments, each sinusoidal line may make two complete sinusoidal cycles between two vertices or intersection points (e.g., along each edge of each pixel 330b). In other embodiments, each sinusoidal conductive line may make a different number of cycles between two vertices. In some embodiments, electrodes 360b and 370b may be formed as continuous curves. In other embodiments, electrodes 360b and 370b may be formed as a number of short straight line sections arranged in a triangular waveform shaped to approximate a sinusoidal shape. In other embodiments, electrodes 360b and 370b may be formed as other types of curves. In some embodiments, electrodes 360b and 370b may be formed as curves extending from a path that would be taken by a straight line between the vertices linked by the conductive metal line. In other examples, the amplitude of the sinusoidal wave form of electrodes 360b and 370b may be varied. For example, the distance the peaks of electrodes 360b and 370b extend away from a path that would be taken by a straight line between pixels 330b may be varied. The amplitude may be varied between the different electrodes 360*b* and 370*b*, and may also be varied at different points along one, some or all of electrodes 360*b* and 370*b*. Similarly the wavelength of the sinusoidal waveform may vary between different electrodes 360*b* and 370*b* and may also vary at different points along one, some or all of electrodes 360*b* and 370*b*. In some embodiments, a phase change between the sinusoidal shapes of electrodes 360*b* and 370*b* may occur where electrodes 360*b* and 370*b* interconnect at connection points. Some embodiments may comprise a combination of two or more of the alternatives discussed above.

Compared to the straight lines of electrodes 360*a* and 370*a*, the sinusoidal shape of electrodes 360*b* and 370*b* may reduce diffraction effects. Such diffraction effects may result in the appearance of "starburst" patterns when screen 310*b* is subject to bright ambient light. Such diffraction effects may result in color shifting, changing the apparent colors of liquid crystal display (LCD) elements of a display visible through a touch position-sensing panel, and may obscure the image being displayed. The sinusoidal shape of electrodes 360*b* and 370*b* may also reduce the visibility of reflections from electrodes 360*b* and 370*b* when screen 310*b* is illuminated by light from a point illumination source, such as the sun on a clear day. The sinusoidal shape of electrodes 360*b* and 370*b* may tend to distribute or disperse the apparent position of such reflections on screen 310*b*, and so may minimize the perceived visibility of repetitive reflection patterns. Such repetitive reflection patterns may be readily perceived by the human eye.

Figure 3C:
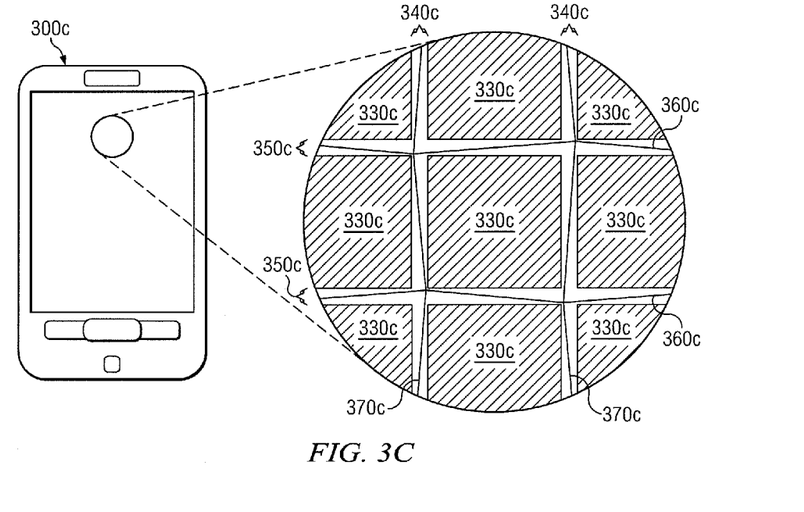
FIG. 3C illustrates an electronic device and an enlarged view of its touch screen with substantially non-orthogonal electrodes.

FIG. 3C illustrates an electronic device and an enlarged view of its touch screen with substantially non-orthogonal electrodes. Similar to electronic device 300*a*, electronic device 300*c* includes a screen 310*c* in which drive electrodes 360*c* and sense electrodes 370*c* are aligned with gaps 350*c* and 340*c*, respectively, between pixels 330*c*. Drive electrodes 360*c* and sense electrodes 370*c* may, in most respects, be similar to drive electrodes 360*a* and sense electrodes 370*a*, however, as can be seen in the depicted embodiment, drive electrodes 360*b* and sense electrodes 370*b* are not orthogonal with respect to pixels 330*c*. In certain situations, the non-orthogonal arrangement of drive electrodes 360*c* and sense electrodes 370*c* with respect to pixels 330 may reduce the amount with which drive electrodes 360*a* and sense electrodes 370*a* obscure banks of similar colored pixels when electronic device 300*c* is viewed from oblique angles.

With respect to FIGS. 3A-3C, pixels 330*a*/330*b*/330*c* (pixels 330) may be colored pixels from any of a variety of different types of displays (e.g., LCD displays, OLED displays, etc.). These pixels may collectively be used to form color images. The size and shape of pixels 330 may vary depending on the embodiment. While the depicted embodiments comprise substantially square pixels, other embodiments may comprise rectangular pixels and/or pixels of varying size (e.g., each primary color may comprise a different size/shape of pixel). The size of gaps 340*a*/340*b*/340*c* (gaps 340) and 350*a*/350*b*/350*c* (gaps 350) between pixels 330 may depend on the embodiment, manufacturing process, and/or operational constraints. For example, depending on the embodiment gaps 340 and 350 may be between approximately 5 micrometers and 26 micrometers (e.g., 10 micrometers). Drive electrodes 360*a*/360*b*/360*c* (drive electrodes 360) and sense electrodes 370*a*/370*b*/370*c* (sense electrodes 370) (collectively, electrodes 360 and 370) may be aligned with gaps 340 and 350 so as to not cross over one or more of pixels 330. As a practical matter, in certain instances, manufacturing tolerances may result in some electrodes 360 or 370 crossing over portions of some pixels 330.

Although the depicted electronic devices 300*a*/300*b*/300*c* (electronic device 300) comprise smartphones, screens 310*a*/310*b*/310*c* (screen 310) may be a component of any type of electronic device that includes a touch sensitive display screen. The touch sensitive display screen may include any type of display, including but not limited to liquid crystal (LCD) displays, active matrix liquid crystal displays, electroluminescent displays, electrophoretic displays, plasma displays, cathode-ray displays, organic light emitting diode (OLED) displays, or the like. By locating electrodes 360 and 370 between pixels 330, screen 310 may have improved image quality. The improvement may be achieved, in part, because electrodes 360 and 370 may not obstruct light emitted from pixels 330 and may reduce the reflections from electrodes 360 and 370.

In FIGS. 3A-3C electrodes 360 and 370 may be formed by conductive lines arranged to interconnect at connection points to define a conductive grid or mesh pattern made up of an array of substantially square shaped mesh cells that correspond in size and shape to pixels 330. The connection points of electrodes 360 and 370 are the vertices of the substantially square shaped mesh cells. Electrodes 360 and 370 may be formed of copper, silver, or other electrically conductive material with a width in the range of approximately 1 micrometer to approximately 10 micrometers. The size of the mesh pattern, that is, the spacing of the vertices, may be in the range of approximately 30 micrometers to approximately 90 micrometers to correspond to the size of pixels 330. In some embodiments, the mesh pattern may comprise a square pattern in which each square is approximately 78 micrometers. In certain embodiments, the mesh pattern may comprise a rectangle pattern in which each rectangle is approximately 40 micrometers by 80 micrometers. In some embodiments, the size and shape of the pattern may vary according to a repeatable pattern (e.g., alternating between a wider rectangle and a narrower rectangle). In one example, the electrode pattern may be arranged so that no more than approximately 5% of the surface is covered by electrodes 360 and 370. Thus, the contribution of electrodes 360 and 370 to the attenuation of light through a sensor should not be more than approximately 5% (e.g., between approximately 2% and 5%). This attenuation may be further reduced by aligning electrodes 360 and 370 with gaps 340 and 350 between pixels 330. In some embodiments, electrodes 360 and 370 may be aligned close to pixels 330 such that the divergence angle of light from pixels 300 is such that it experiences little, or no, attenuation (e.g., approximately 0.5 to 2%) from electrodes 360 and 370. In some embodiments, the closer electrodes 360 and 370 are to pixels 330 the greater the widths are of electrodes 360 and 370 (e.g., to reduce impedance) while still maintaining an attenuation of light in the approx range of 2% to 5%. Accordingly, although electrodes 360 and 370 may be opaque, in this example, the combined optical transmissivity of the electrode pattern may be 90% or more, allowing any pixels below the touch sensor to be visible with little perceptible darkening or other loss of display quality.

Although only three different electrode patterns have been depicted, other embodiments may comprise any of a myriad of different patterns for electrodes 360 and 370. For example, although the depicted electrode patterns may be formed by a number of substantially square shaped mesh cells that meet at vertices, such is not a requirement. Instead, in some embodiments, each of the square shaped mesh cells may be separated from adjacent cells by a connecting segment. The connecting segments may be straight or non-linear (e.g., sinusoidal). As another example, the mesh pattern may be made up of an array of octagonal shaped mesh cells. In one example, the mesh pattern may be made up of an array of diamond shaped mesh cells which tessellate to form the mesh pattern. In one example, the mesh pattern may be made up of an array of two different diamond shaped mesh cells which tessellate to form the mesh pattern. In some embodiments, the electrodes may comprise a combination of sinusoidal portions and straight portions. For example, the electrodes may be substantially straight for stretches with sinusoidal sections inserted periodically to help with diffraction. In some embodiments, the sinusoidal sections may be placed based on the size of gaps 340 and 350 (e.g., where the gap is greater, sinusoidal portions may be used, where the gaps are narrower straight portions may be used). In particular embodiments, the widths of electrodes 360 and 370 may vary. For example, electrodes 360 and 370 may have narrow sections and broader sections. As another example, electrodes 360 and 370 may have a tapering width between the narrow sections and broader sections. As another example, the width can vary non-linearly along the length of the electrode. Certain embodiments may combine any two or more shapes and/or patterns disclosed herein.

The mesh shape formed by electrodes 360 and 370 may correspond to the shape of gaps 340 and 350. For example, if the pixels were triangle shaped, the gaps would be triangle shaped, and the corresponding mesh of electrodes would form a substantially triangular shaped mesh. In some embodiments, a circular polarizer may be included above electrodes 360 and 370 to help reduce diffraction and/or reflections of light from electrodes 360 and 370. In certain embodiments, electrodes 360 and 370 may be formed from copper that has been darkened (e.g., the copper is oxidized or covered with a substantially opaque organic or synthetic coating layer). In certain embodiments, electrodes 360 and 370 comprise conductive traces.

Figure 4:
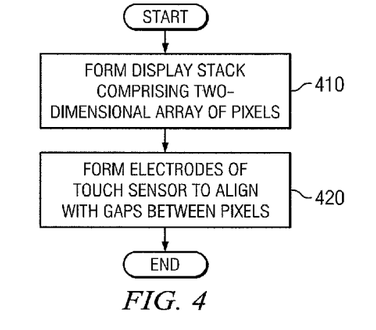
FIG. 4 illustrates a method for forming electrodes in a display stack.

FIG. 4 illustrates a method for forming electrodes in a display stack. The method depicted in FIG. 4 is a sample method in which the touch sensor is integrated into the display stack comprising a two-dimensional array of pixels. The method begins at step 410 where the display stack is formed. The display stack may comprise a plurality of layers that are collectively configured to generate an image. The image may be composed of a two-dimensional array of pixels. The corresponding pixels within the display stack may be separated from one another by gaps. The display stack may be rigid or flexible. The display stack may include, but is not limited to, an LCD display stack, an OLED display stack, an active matrix liquid crystal display stack, an electroluminescent display stack, an electrophoretic display stack, a plasma display, a cathode-ray display, organic light emitting diode (OLED) display stack, or any other display stack configured to generate an image using a two-dimensional array of pixels.

At step 420 electrodes are formed. The electrodes may comprise sense and drive electrodes of a touch sensor. The electrodes may be formed as part of the manufacturing process of the display stack. The electrodes may be formed so as to be substantially aligned with the gaps between the pixels of the display stack. In some embodiments, the electrodes may be aligned with the gaps between the pixels while being non-orthogonal with respect to the pixels. Depending on the embodiment, the electrodes of the touch sensor may be located on the same side of a substrate or on opposite sides of the same substrate or different substrates. In some embodiments, the electrodes may be arranged in a mesh fashion, for example, the drive electrodes may be arranged horizontally while the sense electrodes may be arranged vertically. In some instances, the mesh of electrodes may comprise substantially straight electrodes. In particular instances, the mesh of electrodes may comprise a mesh of sinusoidal electrodes. Regardless of the shape of the electrodes, the shape of the mesh of electrodes may correspond to the shape of the pixels of the display module. In certain embodiments, the electrodes of the touch sensor may be formed by depositing electrically conductive material onto a layer of the display stack of the two-dimensional array of pixels. For example, fine lines of metal material may be deposited on a layer of the display stack such that the lines of metal are substantially aligned with the gaps between the pixels of the two-dimensional array. The fine line metal may be deposited on any of a number of different layers on or above the two-dimensional array of pixels including, but not limited to, an LCD layer, an OLED layer, a color filter layer, a polarizer layer, or an additional layer added to the display stack specifically to provide a substrate for the electrodes. In some embodiments, the electrodes may be laminated between two or more layers in the display stack. In some embodiments, the laminated electrodes may comprise fine lines of metal or other conductive material. The electrodes may be laminated to any layer or layers on or above the two-dimensional array of pixels. In some embodiments, the electrodes may be deposited or laminated on the two-dimensional array of pixels. Depending on the embodiment, the electrodes may be formed in straight lines, sinusoidal lines, jagged or curved lines, or a combination of the above.

FIG. 4 illustrates and example method for forming touch screens in which the electrodes of the touch sensor are aligned with the gaps between the pixels of the display. Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
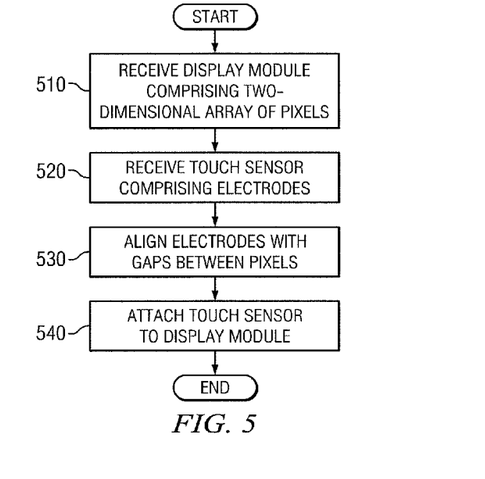
FIG. 5 illustrates a method for attaching electrodes to a display module.

FIG. 5 illustrates a method for attaching electrodes to a display module. The depicted method in FIG. 5 is a sample method in which the electrodes of a touch sensor are aligned with the gaps between the pixels of a display module. In the depicted embodiment, the method begins at step 510 with the receipt of a display module comprising a two-dimensional array of pixels. In some embodiments, the display module may be any component configured to produce an image (e.g., a color image, a video image, a still picture image, etc.). The type of display module may vary depending on the embodiment. For example, the display module may comprise, but is not limited to, an LCD display module, an active matrix liquid crystal display module, an electroluminescent display module, an electrophoretic display module, a plasma display module, a cathode-ray display module, an OLED display module, or any other module configured to produce an image through a two-dimensional array of pixels. The display module may comprise a complete display screen ready to be installed in an electronic device. For example, the display module may include a completed display stack and other components configured to use the display module to create an image comprising a two-dimensional array of pixels.

The display module may be received from an outside source. For example, a touch screen manufacturer may acquire the display module from a display module supplier and then add the touch sensor to the display module. In some embodiments, the touch screen manufacturer may also provide the display module. For example, the display module may be received from a separate device configured to manufacture display modules, the separate device may be operated by the touch screen manufacturer.

At step 520 a touch sensor is received. The touch sensor may comprise a plurality of electrodes. The electrodes may comprise a combination of drive electrodes and sense electrodes. Depending on the embodiment, the electrodes of the touch sensor may be located on the same side of a substrate or on opposite sides of the same substrate or different substrates. In some embodiments, the touch sensor and its corresponding electrodes may be a part of a cover lens that is placed over the display module. The cover lens may be made of material configured to receive touch input from a user. The touch input may be detected and sensed by the touch sensor. In some embodiments, the electrodes of the touch sensor may be made of fine lines of metal (e.g., copper, silver, etc.). In some embodiments, the electrodes may be arranged in a mesh fashion, for example, the drive electrodes may be arranged horizontally while the sense electrodes may be arranged vertically. In some instances, the mesh of electrodes may comprise substantially straight electrodes. In particular instances, the mesh of electrodes may comprise a mesh of sinusoidal electrodes. Regardless of shape of the electrodes, the shape of the mesh of electrodes may correspond to the shape of the pixels of the display module. The touch sensor may be received from any of a variety of sources including a touch sensor supplier, the display module supplier, or it may be manufactured by the touch screen manufacturer on a separate device.

At step 530 the electrodes are aligned with gaps between the pixels of the display module. The pixels of the two-dimensional array of pixels of the display module will comprise a gap therebetween. The gap size may vary. In some instances the gap may be approximately ten micrometers wide. The electrodes of the touch sensor may be aligned with these gaps so as to avoid covering the pixels of the display module. This may improve the image quality produced by the display module. The shape and size of the mesh of the electrodes may correspond to the shape and size of the pixels of the display module. This may allow the electrodes to be aligned so as to minimize the number of pixels over which the electrodes pass.

At step 540 the touch sensor is attached to the display module. In certain embodiments, the alignment and attachment steps may be performed concurrently. The touch sensor may be attached through any of a variety of different means. For example, an adhesive may be used to attach the touch sensor to the display module.

FIG. 5 illustrates an example method for forming touch screens in which the electrodes of the touch sensor are aligned with the gaps between the pixels of the display. Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:
 a two-dimensional array of pixels configured to produce an image; and
 a touch sensor comprising a plurality of electrodes, the plurality of electrodes comprising:
  a first plurality of electrodes extending generally in a first direction; and
  a second plurality of electrodes extending generally in a second direction, the first and second directions being different directions;
 the plurality of electrodes aligned with one or more gaps between two or more pixels of the two-dimensional array of pixels such that:

the first plurality of electrodes and the second plurality of electrodes do not cross over at least one pixel of the two-dimensional array of pixels; and a vertex formed by a crisscrossing, in plan view, of an electrode of the first plurality of electrodes and an electrode of the second plurality of electrodes is aligned with at least one of the one or more gaps between the two or more pixels of the two-dimensional array of pixels, wherein the electrode of the first plurality of electrodes and the electrode of the second plurality of electrodes are configured to capacitively couple across a dielectric material at the vertex.

2. The apparatus of claim 1, wherein:
the two-dimensional array of pixels comprises one or more layers within a display stack; and
the plurality of electrodes of the touch sensor is between the two-dimensional array of pixels and a top layer of the display stack.

3. The apparatus of claim 1, wherein:
the two-dimensional array of pixels comprises one or more layers within a display stack; and
the plurality of electrodes of the touch sensor is coupled to a top layer of the display stack.

4. The apparatus of claim 1, wherein the plurality of electrodes comprises a mesh of substantially straight electrodes.

5. The apparatus of claim 1, wherein the plurality of electrodes comprises a mesh of substantially sinusoidal electrodes.

6. The apparatus of claim 5, wherein a distance between a peak and a valley of any given wave of the substantially sinusoidal electrodes is based on a distance of a gap between two respective pixels of the two-dimensional array of pixels.

7. The apparatus of claim 1, wherein the plurality of electrodes comprises a mesh of fine lines of metal electrodes.

8. The apparatus of claim 1, wherein the two-dimensional array of pixels comprises a two-dimensional array of liquid crystal display (LCD) pixels configured to produce an image.

9. The apparatus of claim 1, wherein the two-dimensional array of pixels comprises a two-dimensional array of organic light emitting diode (OLED) pixels configured to produce an image.

10. The apparatus of claim 1, wherein the two-dimensional array of pixels and the touch sensor are flexible.

11. The apparatus of claim 1, wherein each electrode of the plurality of electrodes comprises a width that is based on a distance of a gap between two respective pixels.

12. A method, comprising:
receiving a display module comprising a two-dimensional array of pixels configured to produce an image;
receiving a touch sensor comprising a plurality of electrodes, the plurality of electrodes comprising:
a first plurality of electrodes extending generally in a first direction; and
a second plurality of electrodes extending generally in a second direction, the first and second directions being different directions;
aligning the plurality of electrodes with one or more gaps between one more pixels of the two-dimensional array of pixels such that:
the first plurality of electrodes and the second plurality of electrodes do not cross over at least one pixel of the two-dimensional array of pixels; and a vertex formed by a crisscrossing, in plan view, of an electrode of the first plurality of electrodes and an electrode of the second plurality of electrodes is aligned with at least one of the one or more gaps between the two or more pixels of the two-dimensional array of pixels, wherein the electrode of the first plurality of electrodes and the electrode of the second plurality of electrodes are configured to capacitively couple across a dielectric material at the vertex; and
attaching the touch sensor to the display module.

13. The method of claim 12, wherein the plurality of electrodes comprises a mesh of substantially straight electrodes.

14. The method of claim 12, wherein the plurality of electrodes comprises a mesh of substantially sinusoidal electrodes.

15. The method of claim 12, wherein the plurality of electrodes comprises a mesh of fine line metal electrodes.

16. A method, comprising:
forming a display stack comprising a two-dimensional array of pixels configured to produce an image; and
forming a plurality of electrodes of a touch sensor within the display stack, the plurality of electrodes comprising:
a first plurality of electrodes extending generally in a first direction; and
a second plurality of electrodes extending generally in a second direction, the first and second directions being different directions;
the plurality of formed electrodes aligned with one or more gaps between one more pixels of the two-dimensional array of pixels such that:
the first plurality of electrodes and the second plurality of electrodes do not cross over at least one pixel of the two-dimensional array of pixels; and
a vertex formed by a crisscrossing, in plan view, of an electrode of the first plurality of electrodes and an electrode of the second plurality of electrodes is aligned with at least one of the one or more gaps between the two or more pixels of the two-dimensional array of pixels, wherein the electrode of the first plurality of electrodes and the electrode of the second plurality of electrodes are configured to capacitively couple across a dielectric material at the vertex.

17. The method of claim 16, wherein forming the plurality of electrodes comprises depositing the plurality of electrodes on at least one layer within the display stack.

18. The method of claim 16, wherein forming the plurality of electrodes comprises laminating the plurality of electrodes on at least one layer within the display stack.

19. The method of claim 16, wherein the plurality of electrodes comprises a mesh of substantially straight electrodes.

20. The method of claim 16, wherein the plurality of electrodes comprises a mesh of substantially sinusoidal electrodes.

21. The method of claim 16, wherein the plurality of electrodes comprises a mesh of fine lines of metal electrodes.

22. The apparatus of claim 1, wherein a first gap of the one or more gaps between the two or more pixels is between 5 micrometers and 26 micrometers.

* * * * *